(12) United States Patent
Abou-Zeid

(10) Patent No.: US 8,441,140 B2
(45) Date of Patent: May 14, 2013

(54) METHOD AND SYSTEM FOR AIR VELOCITY GENERATED ELECTRICAL POWER

(76) Inventor: Pierre M. Abou-Zeid, Oro Valley, AZ (US)

( * ) Notice: Subject to any disclaimer, the term of this patent is extended or adjusted under 35 U.S.C. 154(b) by 427 days.

(21) Appl. No.: 12/624,132

(22) Filed: Nov. 23, 2009

(65) Prior Publication Data

US 2010/0140954 A1   Jun. 10, 2010

Related U.S. Application Data

(60) Provisional application No. 61/199,952, filed on Nov. 21, 2008.

(51) Int. Cl.
*F03D 9/00* (2006.01)
*H02P 9/04* (2006.01)

(52) U.S. Cl.
USPC .............................................. 290/55; 290/44

(58) Field of Classification Search ............. 290/55, 290/44, 43
See application file for complete search history.

(56) References Cited

U.S. PATENT DOCUMENTS

| | | | | |
|---|---|---|---|---|
| 3,876,925 A | * | 4/1975 | Stoeckert | 322/1 |
| 4,408,127 A | * | 10/1983 | Santos, Sr. | 290/54 |
| 5,495,754 A | | 3/1996 | Starr, Jr. et al. | |
| 5,734,202 A | * | 3/1998 | Shuler | 290/55 |
| 6,201,313 B1 | * | 3/2001 | Nakamats | 290/54 |
| 6,700,215 B2 | * | 3/2004 | Wu | 290/44 |
| 6,765,309 B2 | * | 7/2004 | Tallal et al. | 290/55 |
| 6,838,782 B2 | * | 1/2005 | Vu | 290/55 |
| 6,897,575 B1 | * | 5/2005 | Yu | 290/44 |
| 7,040,544 B2 | | 5/2006 | Guyer | |
| 7,112,893 B1 | * | 9/2006 | Villanueva | 290/55 |
| 7,208,846 B2 | | 4/2007 | Liang | |
| 7,357,599 B2 | * | 4/2008 | Cripps | 405/75 |
| 7,579,701 B1 | * | 8/2009 | White | 290/43 |
| 7,665,554 B1 | * | 2/2010 | Walsh | 180/2.2 |
| 7,868,476 B2 | * | 1/2011 | Baca et al. | 290/55 |
| 7,999,407 B2 | * | 8/2011 | Saluccio | 290/54 |
| 8,072,091 B2 | * | 12/2011 | Wilson et al. | 290/55 |
| 2007/0284155 A1 | * | 12/2007 | Cong | 180/2.2 |
| 2009/0096218 A1 | * | 4/2009 | Nightingale | 290/55 |
| 2009/0146425 A1 | * | 6/2009 | Widisky | 290/44 |
| 2009/0174191 A1 | * | 7/2009 | Tomoyasu | 290/55 |

* cited by examiner

*Primary Examiner* — Hae Moon Hyeon

(57) ABSTRACT

A new and useful concept is provided for utilizing an air flow in connection with a primary function, that is not a waste function and uses the flow of air for a useful purpose to produce electricity. A fluid driven turbine is located in the path of the flow of air, the turbine having turbine blades rotatable about an axis of rotation, the turbine blades located in the path of the air flow, and the axis of rotation of the turbine oriented transverse to the flow of air, to rotate the turbine from the flow of air in the primary system, and generating electricity from the rotation of the turbine.

12 Claims, 8 Drawing Sheets

STAND ALONE UNIT

METHOD AND SYSTEM FOR AIR VELOCITY GENERATED ELECTRICAL POWER

RELATED APPLICATION/CLAIM OF PRIORITY

This application is related to and claims priority from provisional application Ser. No. 61/199,952, filed Nov. 21, 2008, which provisional application is incorporated by reference herein.

INTRODUCTION

With energy costs increasing and the concern over global warming, there is a push to use renewable energy. There are different forms of renewable energy sources, Biomass/Biofuels, Geothermal, Hydropower, Solar, Wave/Tidal and Wind.

On Jul. 9, 2009, Dr. Kristina M. Johnson, Under Secretary of the U.S. Department of Energy ("DOE"), addressed the Congressional Committee on Science and Technology, Subcommittee on Science and Technology. She stated that wind and solar photo voltaic ("PV") electricity generation are not based on thermoelectric power cycles and only require minimal water for occasional cleaning. According to the DOE Report titled "20% Wind Energy by 2030: Increasing Wind Energy's Contribution to U.S. Electricity Supply," under discussion at that time, Dr. Johnson estimated that "in a 20 percent wind by 2030 scenario, water consumption for power generation could be reduced by 17 percent in 2030 as compared to the business-as-usual scenario, saving roughly 1.2 Bgal/d."

Further, Secretary Chu stated, "Wind energy will be one of the most important contributors to meeting President Obama's target of generating 10 percent of our electricity from renewable sources by 2012," said Secretary Chu . . . so that it [i.e., wind technology] can reliably supply a substantial portion of our nation's electricity. They will also help in creating more new jobs and expanding a clean energy economy."

Wind Energy presently requires mounting a Turbine/Generator on a high tower and set in an open field whereby the wind would rotate the turbine, thus generating electricity. Wind farms containing many of these units are seen in different areas, but they fall short of having a major effect due to a need for many of these towers and their dependence on the prevailing wind which limits where they can be installed. Smaller units for individual use are available but they also must be mounted on a tower high above any obstruction in order to properly capture the wind.

Wind generated electric power is a clean alternative source of energy. Unfortunately, in nature wind velocities are not always prevalent in order to take full advantage of this source, thus only a small portion of required power is produced in this manner. However in every day life, wind (air) velocities are consistently available, such as in central air conditioning systems. This application provides new and useful ways of generating and using of wind generated electric power.

SUMMARY OF THE PRESENT INVENTION

The present invention relates to a new and useful paradigm for utilizing an air flow to produce electricity, to provide a clean alternative source of electrical energy, and in its preferred form to either use that electrical energy in the facility from which it is generated, or to store that electrical energy (e.g. for subsequent use in the facility from which it is generated).

In one of its aspects, the present invention provides a method of generating electricity from an air flow, that comprises (a) providing a primary system in which a flow of air is used in connection with a primary function (i.e. some function other than the generation of electricity), (b) locating a fluid driven turbine in the path of the flow of air to rotate the turbine from the flow of air in the primary system, and (c) generating electricity from the rotation of the turbine.

In its preferred form, the method is practiced in a facility from or in which the air flow is produced in connection with the primary function, where the facility includes (a) one or more electrically driven devices, one or more electrical storage devices, or combinations of the foregoing, (b) at least one turbine located in the path of the air flow and oriented so that the air flow rotates the turbine, the rotation of the turbine being effective to generate electricity, and (c) the generated electricity is (i) used to power at least one of the electrically driven devices of the facility, (ii) directed to at least one of the electrical energy storage devices of the facility, or (iii) both used to power at least one of the electrically driven devices and directed to at least one of the electrical energy storage devices. Thus, the electrical energy is generated by the air flow provided for the primary function in the facility, and that electrical energy is either used to drive one or more devices of the facility, or is stored (e.g. for subsequent use in the facility from which it is generated).

The facility can be, e.g. a building, wherein the air flow is produced in an air conditioning system (or heating system) of the building (the air conditioning system or heating system being of a type that may include an air supply, an air exhaust, and an air return), or regulated in one or more variable air volume units of the building. Moreover, the facility can also be a wind tunnel that is used in the study of wind effects on an article located in the wind tunnel, and wherein the air flow is produced in the wind tunnel. In addition, the facility can be a moveable vehicle, where the air flow is produced by a stream of air flowing along a part of the vehicle while the vehicle is moving. In addition, the primary system can also be of a type in which a flow of air is created as a by-product of a primary function. The system could be of a type that creates and throws off air flows as exhaust, such as hot air flows in steam generating plants, laundries, boiler rooms, funnel systems in engine rooms that throw off exhaust (ships, large manufacturing plants, etc.). As the primary system produces whatever it is making (fertilizer, aluminum, cement) it creates heat and that heat in the form of hot air is passed through and out of the system. It is, however, an air flow. So the air flow is a by-product of a primary system, not its main product.

Still further, in a preferred form of practicing the principles of the present invention, the flow of air is in a predetermined direction, and the fluid driven turbine has one or more blades with surfaces oriented substantially transverse to the predetermined direction of flow of air. In this application, the term 'substantially transverse" (in reference to the orientation of the turbine blade(s) relative to the air flow means that the turbine blades are as close as possible to 90 degrees to the direction of the air flow, so that the air flow hits the turbine blades at 90 degrees and maximizes the energy that drives the turbine blades.

Further features of the present invention will be apparent from the following detailed description and the accompanying drawings.

DETAILED DESCRIPTION

As described above, wind generated electric power is a clean alternative source of energy. Unfortunately, in nature wind velocities are not always prevalent in order to take full advantage of this source, thus only a small portion of required power is produced in this manner. However in every day life, wind (air) velocities are consistently available, such as in central air conditioning (or heating) systems. This application provides new and useful ways of generating and using air flow generated electric power. The following detailed description shows examples of the application of the principles of the present invention to facilities such as buildings, wind tunnels and vehicles, and from that description the manner in which the principles of the present invention can be applied to various types of facilities will be apparent to those in the art.

Figure 1:
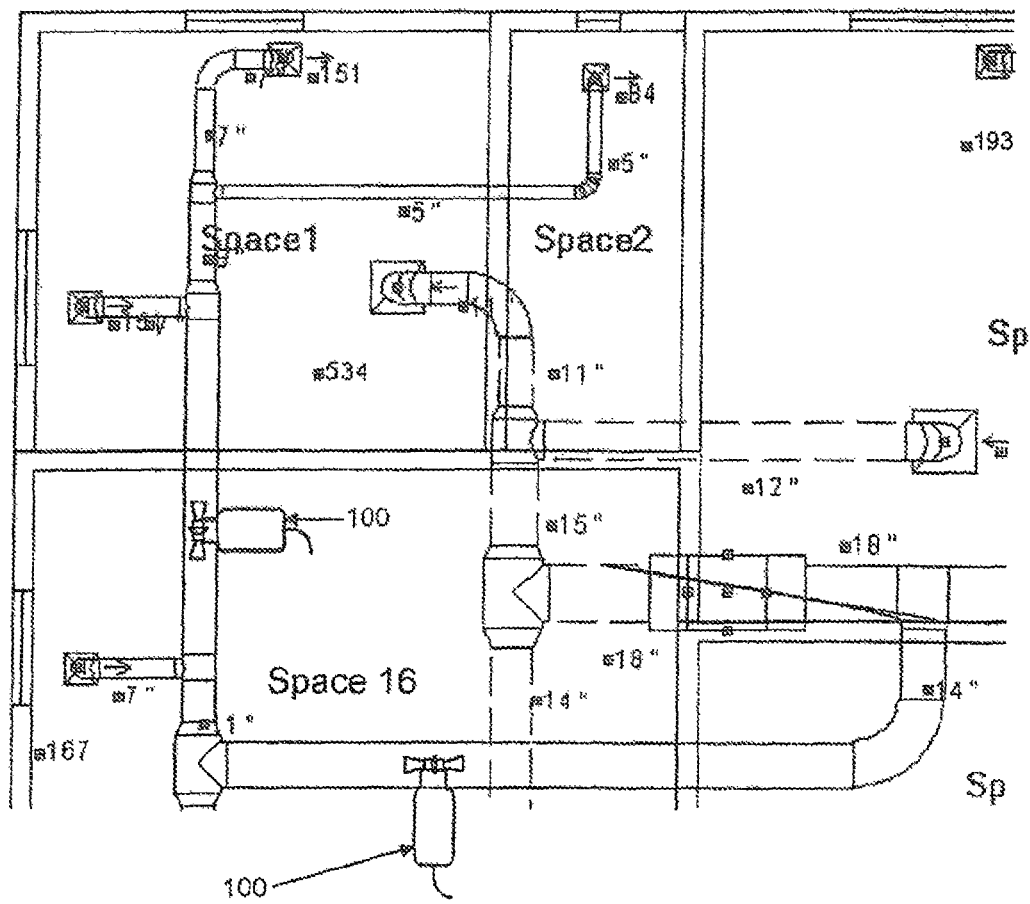
FIGS. 1 and 3 are schematic illustrations of the application of the principles of the present invention to a building with an air conditioning (or heating) system.
Figure 3:
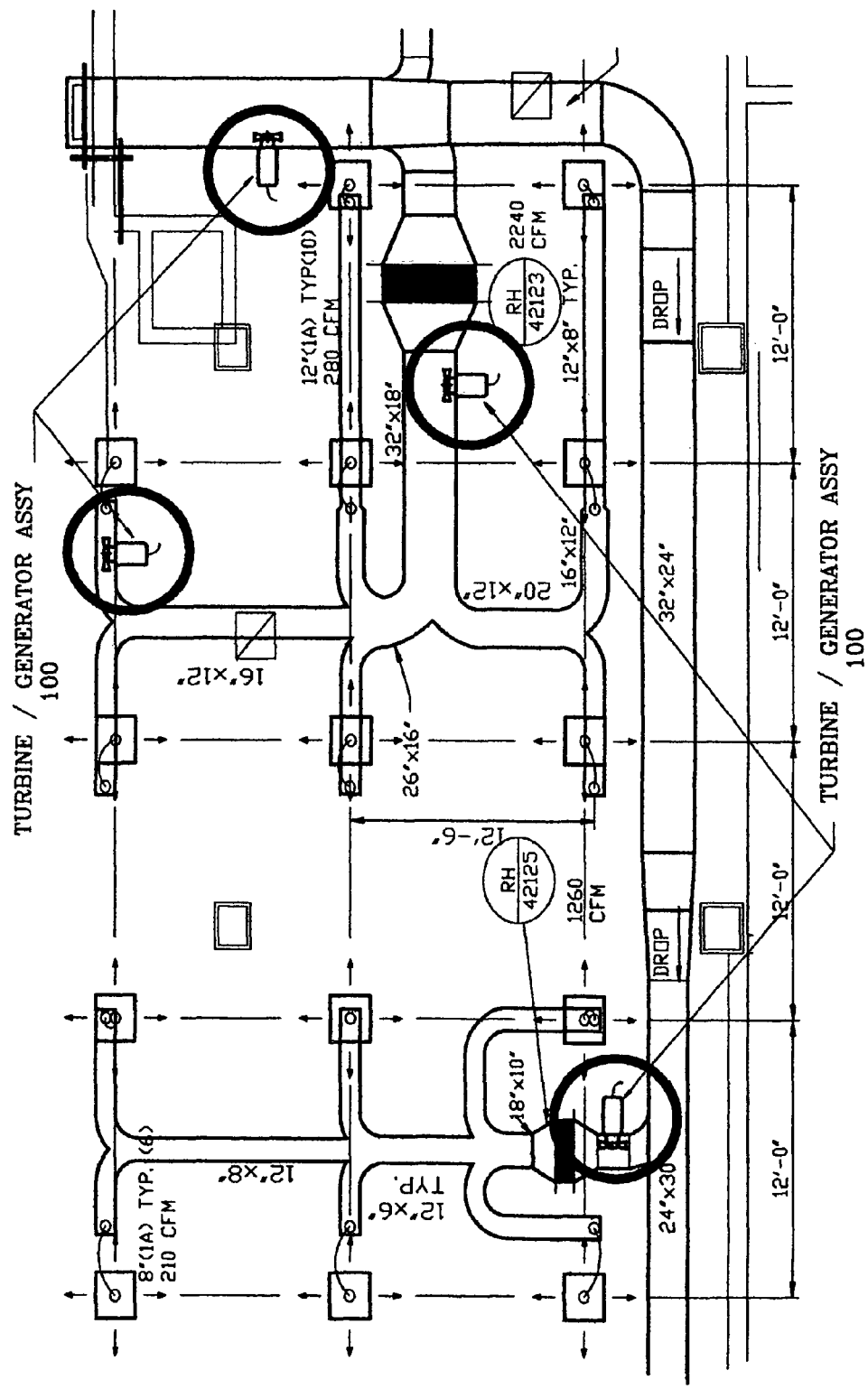
Figure 6:
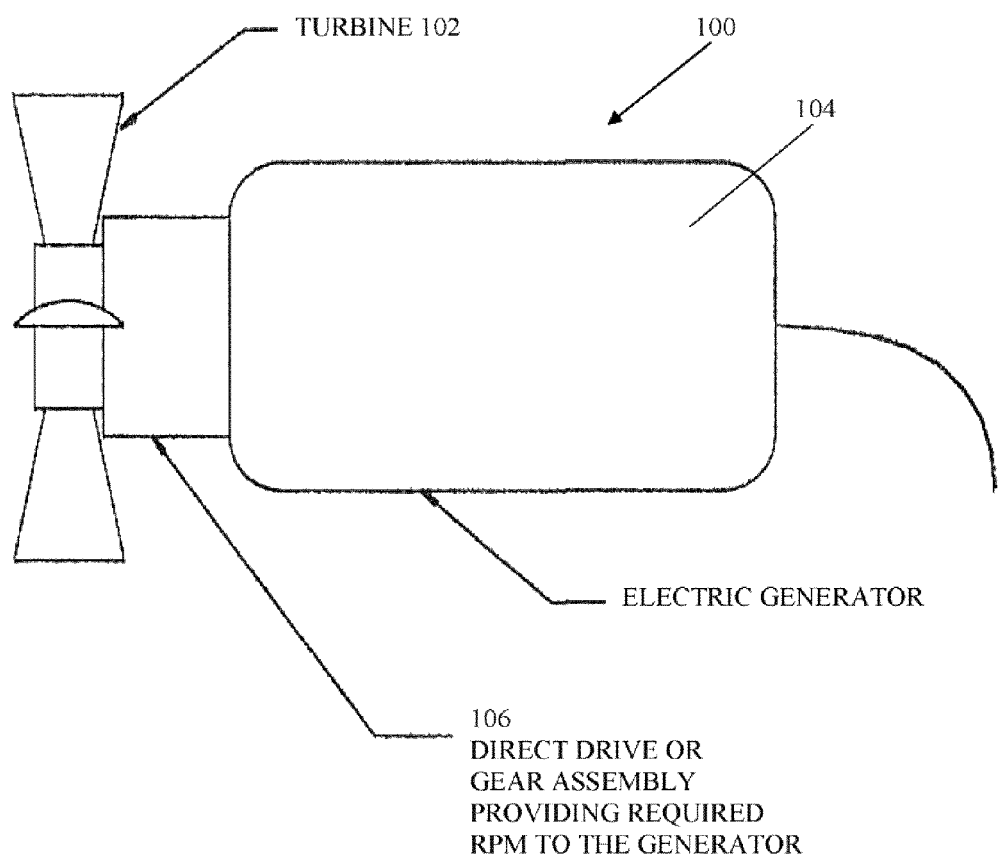
FIG. 6 is a schematic illustration of the structure of a turbine and electrical generator, for a method and system in accordance with the principles of the present invention.
Figure 7:
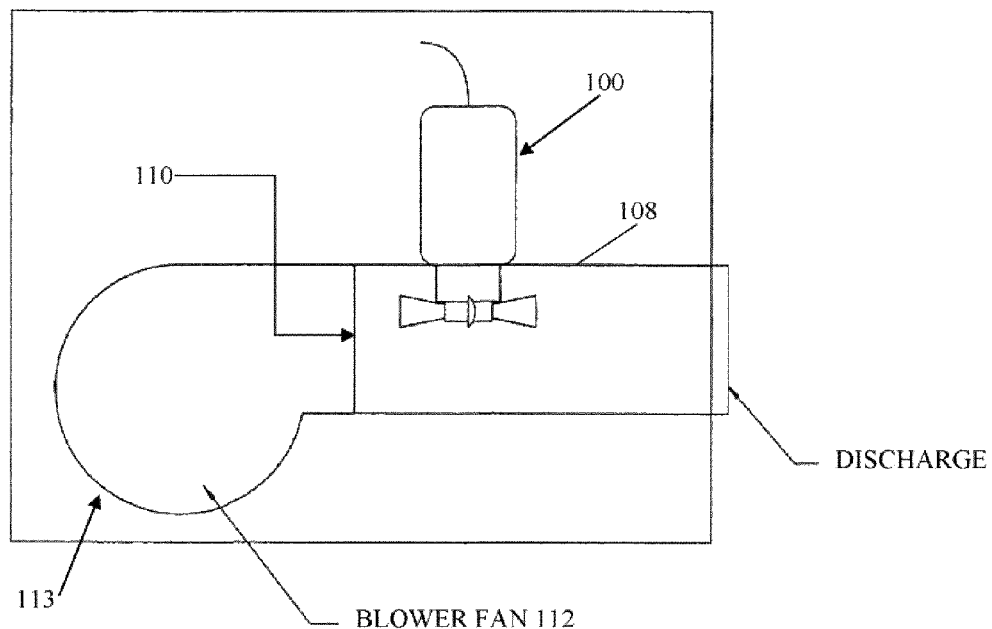
FIG. 7 is a schematic illustration of how the principles of the present invention can be applied to a stand alone unit for generating an air flow and electricity, in accordance with the principles of the present invention.

As shown in FIGS. 1 and 3, the principles of the present invention can be applied to a facility such as a building in connection with a primary function such as an air conditioning (or heating) system that may include supply, exhaust and/or return ducts (conduits). An air flow can be generated in any or all of such supply exhaust and/or return ducts, and that air flow is used to generate electricity, in accordance with the principles of the present invention. As shown in FIG. 6. a basic electrical generator unit 100 comprises a rotatable turbine, an electrical generator 104 and a direct drive or gear assembly 106 connecting the turbine 102 to the electrical generator 104. The drive assembly 106 provides the required RPM from the turbine 102 to the generator 104, and rotation of the turbine 102 provides the input to the generator to generate electricity from the rotation of the turbine. As shown schematically in FIG. 7, the generator unit 100 can be located in a duct or conduit 108 with the turbine blades located in the path of an air flow generated in the conduit. In FIG. 7, the direction of the airflow is represented by the arrow 110. The blades of the turbine are oriented substantially transverse to the direction of the airflow (meaning that the turbine blades are as close as possible to 90 degrees to the air flow, so that the air flow hits the turbine blades at 90 degrees and maximizes the energy that drives the turbine blades).

In the example of FIGS. 1 and 3, where the principles of the invention are applied to the air conditioning (or heating) system of a building, FIG. 1 shows the location of air/wind generators such as the supply, exhaust. and/or return ducts of the system, and FIG. 3 shows the manner in which generator units 100 in accordance with the present invention, and particularly the turbine blades of those units, would be located and oriented in those ducts.

Figure 2:
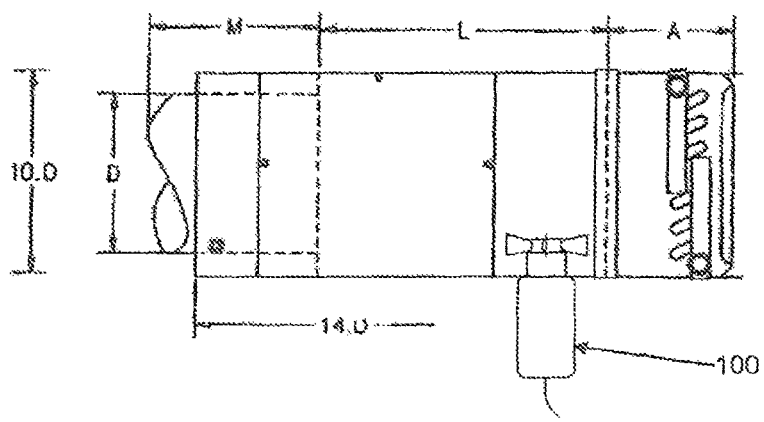
FIG. 2 is a schematic illustration of the manner in which the principles of the present invention are applied to an air flow in a variable volume air unit that regulates air flow in a building.

As shown in FIG. 2, the principles of the present invention can be applied to a facility with a primary function that includes variable air volume units that regulate air flow in a conduit, and a generator unit 100 is located and oriented so that the air flow in the conduit drives the turbine of the generator unit, to generate electric power.

In the examples of FIGS. 1, 3 and FIG. 2, an additional aspect of the present invention is provided in that the electrical power that is generated from the air flow in connection with the primary function of the facility, can be used to operate electrically powered devices of the facility, or that electrical power can be stored (e.g. for subsequent use in operating electrically powered devices of the facility).

In addition, as described above, the primary system can also be of a type in which a flow of air is created as a by-product of a primary function. The system could be of a type that creates and throws off air flows as exhaust, such as hot air flows in steam generating plants, laundries, boiler rooms, funnel systems in engine rooms that throw off exhaust (ships, large manufacturing plants, etc.). As the primary system produces whatever it is making (fertilizer, aluminum, cement) it creates heat and that heat in the form of hot air is passed through and out of the system. It is, however, an air flow. So the air flow is a by-product of a primary system, not its main product.

Figure 4:
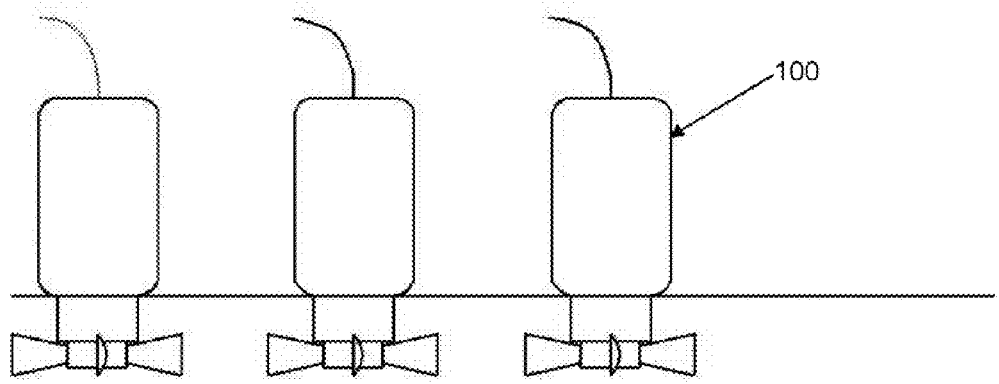
FIG. 4 is a schematic illustration of the application of the principles of the present invention to a wind tunnel.
Figure 4:
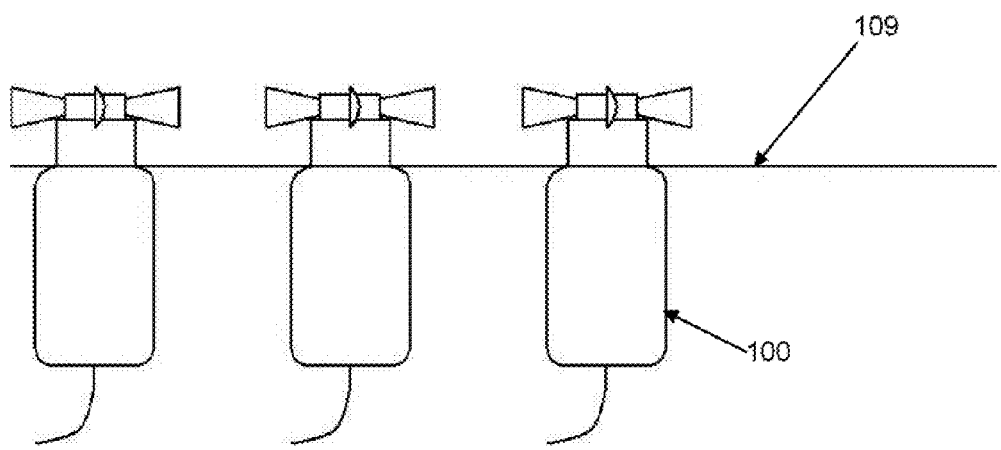

As shown in FIG. 4, the principles of the present invention can also be applied to a primary installation such as a wind tunnel, where a flow of air is directed along a conduit 109, and is used in testing or evaluating the effect of the air flow on objects in the conduit. As shown in FIG. 4, one or more generator units 100, of the type described herein have respective turbines that are located and oriented so that the air flow in the conduit rotates the turbine blades to generate electrical power. The turbine blades are preferably oriented transverse to the direction of the air flow.

Figure 5:
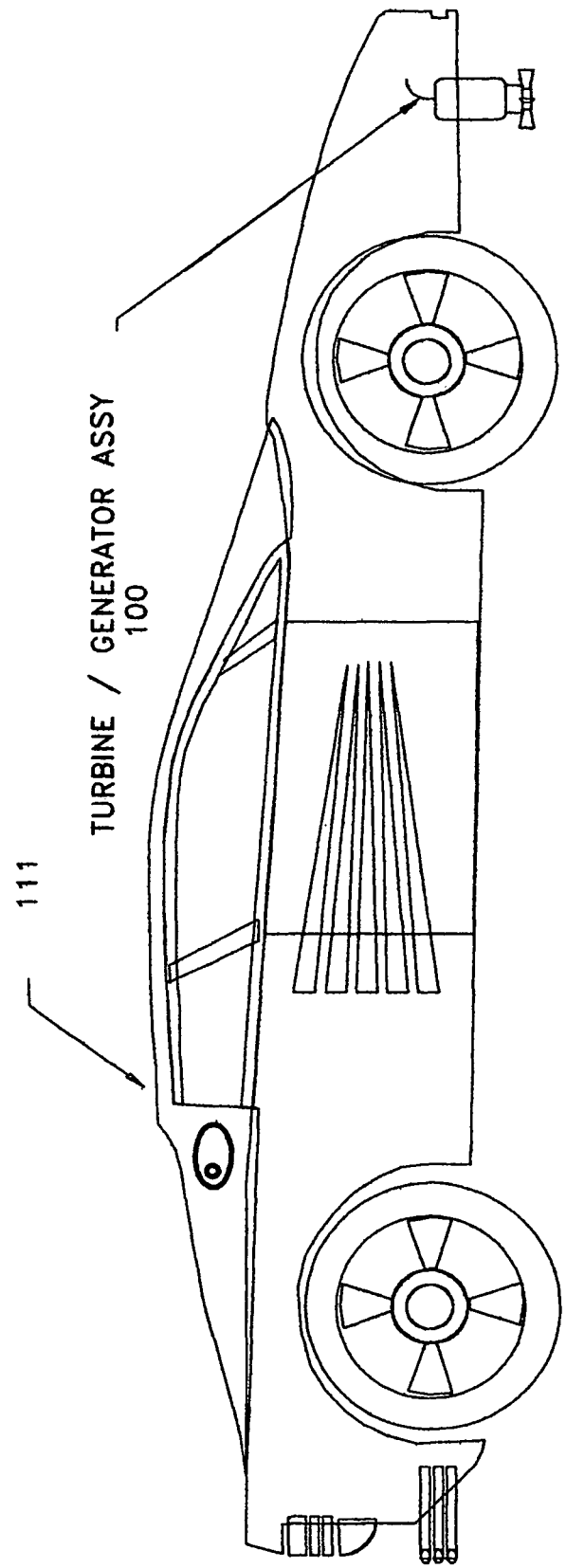
FIG. 5 is a schematic illustration of the application of the principles of the present invention to a vehicle.

FIG. 5 is a schematic illustration of the application of the principles of the present invention in connection with a primary facility in the form of a vehicle 111. The vehicle would have one or more of the generator units 100 attached to the vehicle in locations and orientations such that when the vehicle is moving an air flow is directed in a predetermined direction along the vehicle, and that air flow is used to rotate the turbine blades to generate electricity. The generated electricity can be used to power auxiliary equipment of the vehicle, and can be directed to an energy storage device for subsequent use with the vehicle (e.g. in the case of a hybrid vehicle).

As shown in FIG. 7, the principles of the present invention can be applied in connection with a primary installation such as a stand alone unit 113 for generating an air flow and electricity. In a situation where there is a need to generate electrical power, in a manner that is added to a facility such as a building, the stand alone unit 113 can in turn be used to generate electricity for use in the facility. FIG. 7 shows how that can be accomplished. The stand alone unit includes a blower fan 112 that directs a flow of air along the conduit 108, and the electrical generator 100 is located and oriented so that its turbine blades are transverse to the flow of air (in the direction 110), and the rotation of the turbine blades generates electricity that can be utilized by the facility to which the stand alone unit is attached, or stored for subsequent use.

Figure 8:
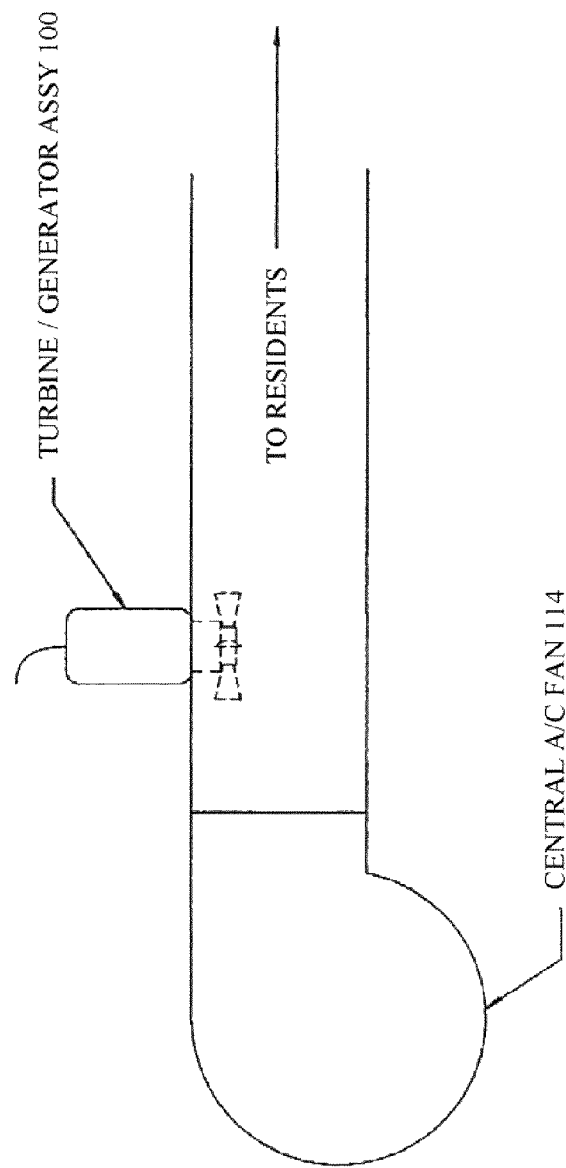
FIG. 8 is a schematic illustration of the application of the principles of the present invention to a residential or small commercial facility.

FIG. 8 further develops the concept of FIG. 7, and shows how the principles of the present invention can be applied to a central air conditioning unit of a residential or small commercial facility. A central air conditioning fan 114 generates the air flow, and the generator unit 100 is located and oriented so that the turbine blades are transverse to the air flow, and are used to generate the electricity that can be used and/or stored in the facility. As described above, this aspect of the present invention can also be applied to a central heating unit of a residential or small commercial facility.

Figure 9:
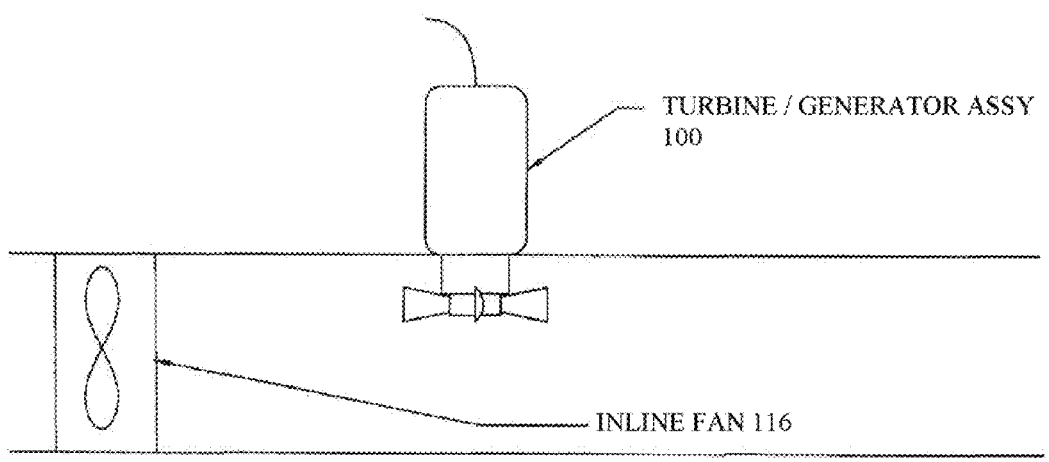
FIG. 9 is a schematic illustration of the application of the principles of the present invention to a facility with an inline fan.

FIG. 9 is a schematic illustration of the application of the principles of the present invention to a facility with a primary function that includes an inline fan 116. The fan generates the flow of air, and the generator is located and oriented such that the turbine blades are transverse to the flow of air, and generate the electricity that is used and/or stored by the facility.

Thus, as seen from the foregoing discussion the present invention provides for generating and using wind generated electric power in various ways, e.g.:

a. Where air velocities are generated with the use of a fan blower:

b. In central air conditioning systems, where an electrical generator unit is installed in the duct system whereby the blades of the generator turbine are in the air stream and are rotated by the air velocity thus generating electric power to be used in the building, one or more such devices can be strategically installed throughout the ductwork system (FIG. 1).

c. In an installation in which Variable Air Volume units, which are normally installed throughout the building. The power generated is collected and distributed throughout the building (FIG. 2).

d. In a stand-alone product that includes a fan blower generating air velocities that rotate the turbine blades of a generator to produce electric power. The power used by the fan blower can be a fraction of the power generated.

e. In an installation such as a wind tunnel where multiple generators can be installed in a wind tunnel providing large amounts of electricity f. In a moving facility such as a moving vehicle, where the drafts created when the vehicle is moving direct air velocities over the blades of the generator turbine. The power produced can be used to operate the motor and/or charge the batteries of electric/hybrid vehicles. It can also be used to provide electric power for other uses in the vehicle.

The products mentioned in this application can help produce cheap clean energy while saving natural resources. It should also be noted that besides the A/C fan for the small buildings and the Air Handler fan for the large ones, some commercial buildings have a return fan that sucks the air out to be recirculated. In industrial/research buildings they also have exhaust fans to exhaust fumes out of the building these all will generate airflow that can be used in the application.

In addition, while the principles of the invention are described in connection with an automobile, it will be clear to those in the art that the principles of the present invention can be used with trucks, busses, train, boats, planes, and to a lesser extent motorcycles.

Thus, the present invention relates to a new and useful paradigm for utilizing an air flow to produce electricity, to provide a clean alternative source of electrical energy, and in its preferred form to either use that electrical energy in the facility from which it is generated, or to store that electrical energy (preferably for subsequent use in the facility from which it is generated). With the principles of the invention in mind, it is believed that the manner in which those principles can be used in various ways, with various facilities, to produce electricity from an air flow that has a primary function other than the production of electricity will become apparent to those in the art.

The invention claimed is:

1. A method of generating electricity, comprising
   a. providing a primary system in which a fan generated flow of air is produced in a conduit of the primary system in connection with a primary function that is other than the generation of electricity, where the method is practiced in a building in which the air flow produced in connection with the primary function is produced by one or more devices that regulate air flow in the building,
   b. locating a fluid driven turbine in the path of the flow of air, the turbine having turbine blades rotatable about an axis of rotation, the turbine blades located in the path of the air flow, and the axis of rotation of the turbine oriented transverse to the flow of air, to rotate the turbine from the flow of air in the primary system, and generating electricity from the rotation of the turbine.

2. The method of claim 1, wherein the method is practiced in a facility from or in which the air flow is produced, where the facility includes
   a. the primary system with one or more electrically driven devices, one or more electrical storage devices, or combinations of the foregoing,
   b. the fluid driven turbine is located in the path of the air flow and oriented so that the axis of rotation of the turbine is transverse to the flow of air and the air flow rotates the turbine,
   c. the rotation of the turbine being effective to generate electricity, and wherein the generated electricity is (i) used to power at least one of the electrically driven devices of the facility, (ii) directed to at least one of the electrical energy storage devices of the facility, or (iii) both used to power at least one of the electrically driven devices and directed to at least one of the electrical energy storage devices.

3. The system of claim 2, wherein the facility is a wind tunnel that is used in the study of wind effects on an article located in the wind tunnel, and wherein the air flow and the air flow produced in connection with the primary function is produced in the wind tunnel.

4. The method of claim 1, wherein the air flow is produced in an air conditioning system of the building.

5. The method of claim 1, wherein the air flow produced in connection with the primary function is produced in one or more variable air volume units that regulate air flow in the building.

6. The method of claim 1, wherein the air flow produced in connection with the primary function is produced in a heating system of the building.

7. The method of claim 1, wherein the flow of air is in a predetermined direction and the fluid driven turbine has one or more blades with surfaces oriented substantially transverse to the predetermined direction of flow of air.

8. A system comprising a facility from or in which a fan driven air flow is produced in a conduit of a primary system in connection with a primary function that is other than the generation of electricity, the facility comprising a building in which the air flow produced in connection with the primary function is produced by one or more devices that regulate air flow in the building, and including
   a. one or more electrically driven devices, one or more electrical storage devices, or combinations of the foregoing,
   b. at least one turbine having turbine blades rotatable about an axis of rotation, the turbine blades located in the path of the air flow in the conduit of the primary system and oriented so that the air flow rotates the turbine, wherein the axis of rotation of the turbine is transverse to the direction of the air flow, c. the rotation of the turbine being effective to generate electricity, and
d. the generated electricity being (i) used to power at least one of the electrically driven devices of the facility, (ii) directed to at least one of the electrical energy storage devices of the facility, or (iii) both used to power at least one of the electrically driven devices and directed to at least one of the electrical energy storage devices.

9. The system of claim 8, wherein the facility is a building, the air flow is produced in an air conditioning system of the building.

10. The system of claim 8, wherein the air flow is produced in a heating system of the building.

11. The system of claim 8, wherein the air flow is produced in one or more variable air volume units that regulate air flow in the building.

12. The system of claim 8, wherein the facility is a wind tunnel that is used in the study of wind effects on an article located in the wind tunnel, and wherein the air flow is produced in the wind tunnel.

* * * * *